Nov. 30, 1926.
W. L. EVANS
1,609,076
SPEED REDUCING UNIT
Filed Dec. 5, 1925     2 Sheets-Sheet 1
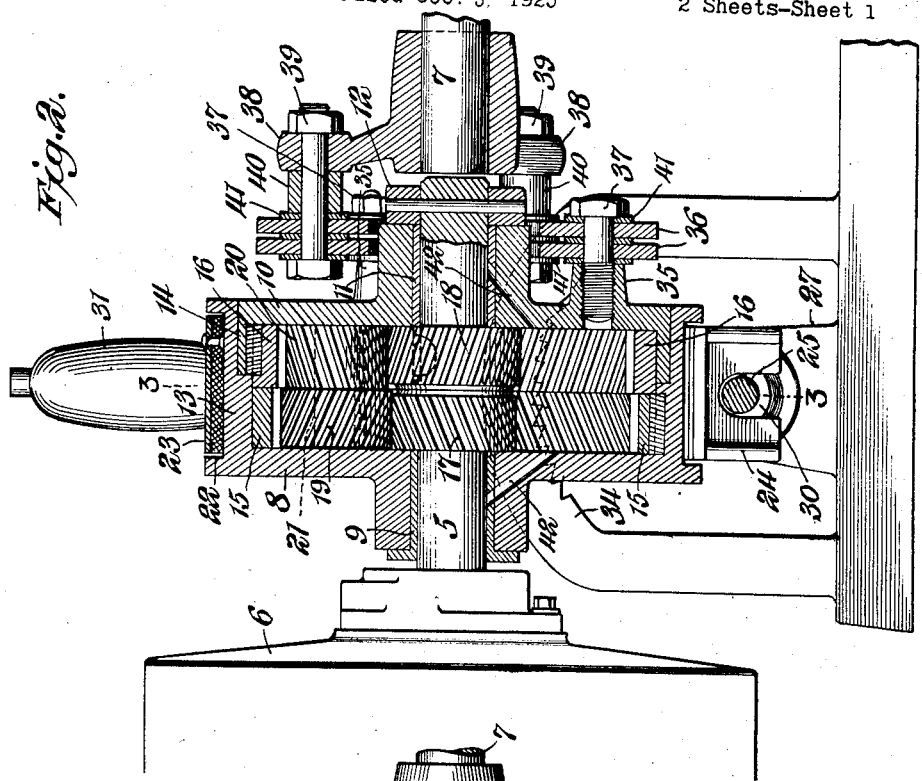
Witnesses
Howard D. Orr
E. N. Lovewell
Inventor,
William L. Evans,
Attorney Nov. 30, 1926.
W. L. EVANS
1,609,076
SPEED REDUCING UNIT
Filed Dec. 5, 1925    2 Sheets-Sheet 2
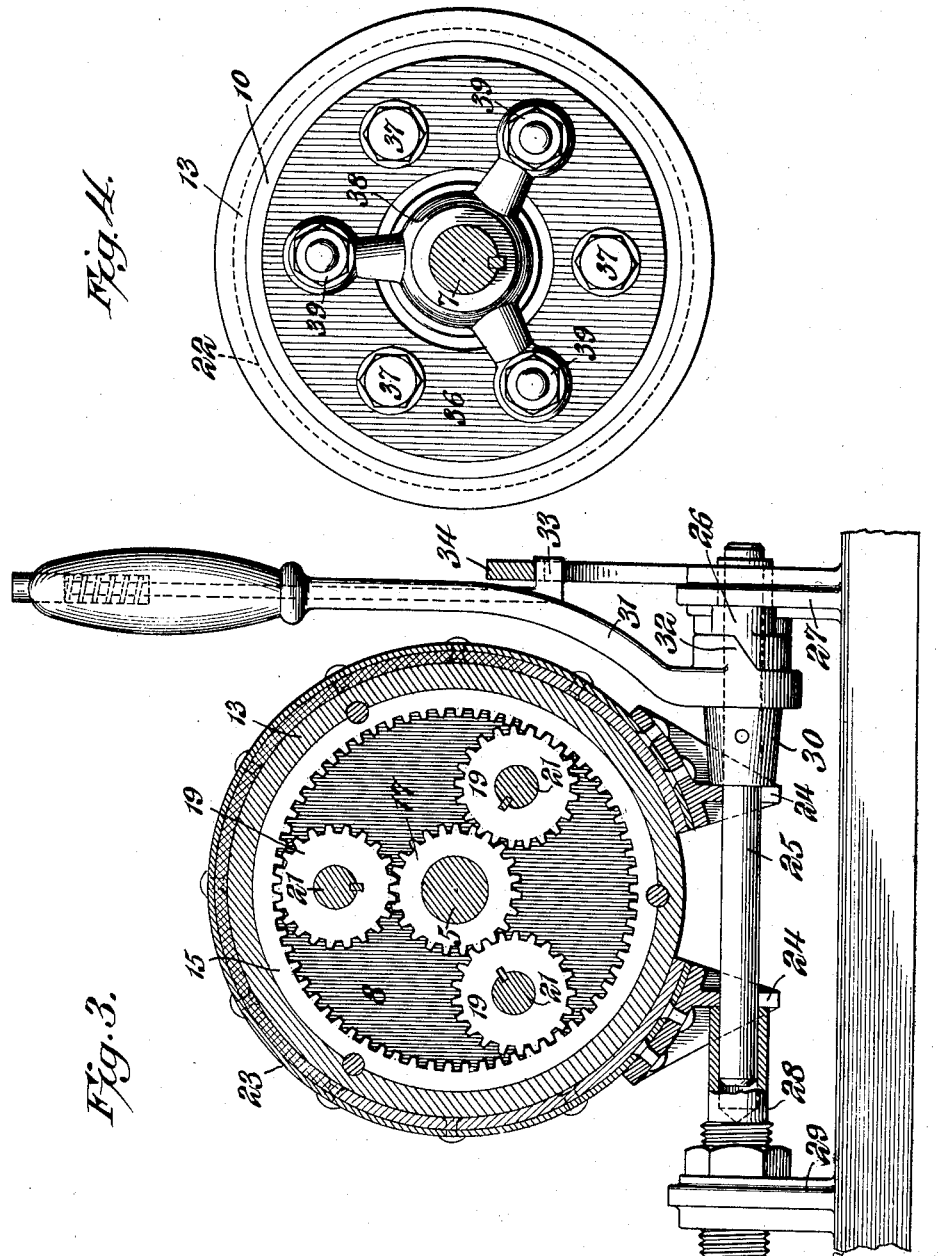
Witnesses
Howard D. Orr
E. N. Lovewell
Inventor,
William L. Evans,
By
E. G. Siggers.
Attorney Patented Nov. 30, 1926.

1,609,076

UNITED STATES PATENT OFFICE.

WILLIAM LEWIS EVANS, OF WASHINGTON, INDIANA.

SPEED-REDUCING UNIT.

Application filed December 5, 1925. Serial No. 73,398.

This invention relates to a speed reducing unit adapted to be connected to two rotatable elements for transmitting power from one to the other. It serves the function of a friction clutch, as well as that of the transmission mechanism.

The general object of the invention is to provide a device of this type which is in practical form for general application, and from which a high multiplication of torque may be obtained with a minimum amount of friction, particularly a device which is more compact and less expensive than those now on the market.

The specific construction of the invention and the principles of its operation will be described in detail in connection with the accompanying drawings, which illustrate one embodiment thereof.

In the drawings:

Figure 1 is a side elevation of the invention.

Figure 2 is a central longitudinal section thereof.

Figure 3 is a transverse section taken substantially on the line 3—3 of Figure 2.

Figure 4 is an end elevation with the driven shaft shown in section.

In its present embodiment, the invention is shown as connected to the power shaft 5 of a motor 6 for transmitting power to a shaft 7, which is in alinement with the shaft 5, and is driven at a greatly reduced speed. The device comprises a housing member 8, which is rotatably mounted on the power shaft 5 by means of a bronze bushing 9, or other suitable bearing unit, and a complementary housing member 10 is likewise rotatably mounted on the shaft 5 by means of a bronze bushing 11, or other suitable bearing member. A retaining collar 12 is secured to the end of the shaft 5.

The housing member 8 is formed with a peripheral rim or flange 13, which is reamed out to receive the corresponding flange or rim 14 of the complementary housing member 10. The two members 8 and 10, therefore, are relatively rotatable, and together constitute a cylindrical housing for the gearing hereinafter described.

A ring gear 15 is secured to the inside of the rim 13, and a ring gear 16, having one more tooth than the ring gear 15, is keyed to the inside of the rim 14. A central idler gear 17 is journaled on the shaft 5 in the plane of the ring gear 15, and a central drive gear 18, having one more tooth than the idler 17 is keyed to the shaft 5 in the plane of the ring gear 16. A number of floating gear elements, not less than three, are mounted between the ring gears and the central gears. Each of these floating gear elements consists of a gear 19, meshing with the ring gear 15 and the central idler 17, and a gear 20 meshing with the ring gear 16 and central drive gear 18. The gears 19 and 20 are secured to a short shaft 21, and are adapted to travel about the central gears. The gears 19 have the same number of teeth as the gears 20. As the shaft 5 and the drive gear 18 are rotated, causing the floating gear units to travel in their orbits, it is obvious that there will be a differential movement between the ring gears 15 and 16, owing to the fact that they have different numbers of teeth. This differential movement will be imparted to the housing member 8 if the latter is free to revolve, while the member 10 remains stationary. If, however, the member 8 is held stationary, the differential movement will be imparted to the member 10, which will constitute a driven member.

For the purpose of controlling the movement of the member 8, the rim or flange 13 is formed on its outer face with a channel 22, adapted to receive a brake band 23. The latter has ears 24 secured to its ends through which passes a shaft 25. This shaft is rotatable, and has a limited longitudinal movement, being mounted at one end in a bearing 26 secured in a fixed bracket 27, and mounted at the other end in a socket 28 which is secured in a fixed bracket 29. A hub 30 is secured to the shaft 25, and has a lever 31 connected thereto, provided with an inclined shoulder 32 which cooperates with the bearing member 26 when the lever 31 is rocked, to move the shaft 25 longitudinally and draw the ends of the brake band toward each other between the hub 30 and socket 28, thereby setting the brake. A latch member 33 is mounted in the lever 31, and cooperates with a toothed quadrant 34 for latching the brake.

The driven member 10 is formed with three or more bosses 35 to which a coupling member 36 is secured by means of bolts 37, or other suitable means. A spider 38, which is keyed to the shaft 7, is secured to the coupling member 36 by bolts 39 or the like, with the provision of suitable spacers 40 and washers 41. Thus, the shaft 7, which is to be driven, is rigidly and securely connected to the driven member 10. The members 8 and 10 fit together to form a housing for the gears, which is adapted to contain oil or grease, and oil holes 42 are provided so that the bearings for the shaft 5 will be lubricated.

If, as shown in the drawings, the ring gear 15 is made with sixty-five teeth, the ring gear 16 with sixty-six teeth, and the center drive gear 18 with twenty-four teeth, it will be readily seen that when the ring gear 15 is held stationary, it will require nearly four revolutions of the drive gear 18 to cause the ring gear 16 to move a distance of one tooth, and it will require approximately 252 revolutions of the shaft 5 to cause one revolution of the shaft 7. The number of teeth in the various gears may, of course, be varied to obtain the speed ratio desired.

It is not expedient, however, to use spur gears for this transmission for the reason that the number of teeth on a spur gear can not be increased without increasing the pitch diameter or the diametral pitch. Consequently, if spur gears are used, either a fractional pitch must be adopted, or the ring gears will not mesh properly with the floating gears and there will be lost motion between the same, resulting in excessive noise and wear. To obviate this difficulty, I have used helical gears.

In order to increase the pitch diameter of a helical gear, and at the same time retain the same number of teeth and the same normal diametral pitch, it is only necessary to increase the angle of the teeth, and conversely to make the gear of less pitch diameter it is only necessary to decrease the angle of the teeth.

The angle of the teeth in gear 15, which has sixty-five teeth, is made greater than the angle of the teeth in gear 16, which has sixty-six teeth, and consequently the teeth in gear 19 must be made with a greater angle than the teeth in gear 20 in order for the teeth to mesh properly with the respective ring gears. In order to retain the same number of teeth in gears 19 and 20, therefore, in the present instance twenty-one teeth, gear 20 must be made of less pitch diameter than the gear 19, and consequently ring gear 15 must have a greater pitch diameter than the ring gear 16. It follows then that the idler gear 17 must have teeth with a greater angle than the teeth on the driven gear 18, in order that the respective gears 17 and 18 will mesh properly with the corresponding floating gears.

It is also obvious that since the ring gear 16 has one more tooth than the ring gear 15, there is only one point in the circumference where a tooth on one ring gear will be directly opposite a corresponding tooth on the other ring gear. In one of the floating gear units, therefore, the centers of the teeth on the gear 20 are in the same radial plane with the centers of the teeth on the corresponding gear 19, while on the second floating gear unit, the teeth on the gear 20 are circumferentially in advance of the teeth on the corresponding gear 19 to a distance of one-third of a tooth, and on the other floating gear they are advanced a distance of two-thirds of a tooth. By constructing the floating gear units in this manner, they may be arranged at approximately equal distances from each other, and will mesh properly with the drive gear 18, idler gear 17 and the respective ring gears. If more than three floating gear units are used, the relative positions of the gear sections will be correspondingly altered.

In designing the gears with different numbers of teeth in order to obtain different speed reduction ratios, the number of teeth in the ring gear 15 should always be equal to the number of teeth in the idler gear 17, plus twice the number of teeth in the gear 19, and the number of teeth in the ring gear 16 should always be equal to the number of teeth in the drive gear 18, plus twice the number of teeth in the gear 20.

It will be noted that the invention herein described is adapted to be manufactured and assembled as a unit, which may be used to connect the motor shaft or other power shaft to any line shaft, or to the shaft of a hoisting drum, conveyer, mixer, or any other machinery which is to be driven at a slow speed. Any suitable means may be used for positively holding the housing member 8, against rotation. The brake, however has the advantage that when much power is required to start the load, it may be tightened gradually, and if a motor is used for power, it will require much less starting torque.

While I have shown and described the specific construction of one form in which the invention may be embodied, it is to be understood that various modifications may be made in various details and in the arrangement of the various parts without any material departure from the essential principles embodied therein. It is my intention, therefore, to include all such modifications within the scope of the appended claims.

What is claimed is:

1. The combination with a power shaft having a helical drive gear secured thereto, and a helical idler gear journaled on the shaft adjacent the drive gear, of helical internal ring gears surrounding the drive gear and idler gear respectively, and a series of floating gear units, each comprising two helical gears, one meshing with the drive gear and the ring gear surrounding the same, and the other meshing with the idler gear and the other ring gear, one of said ring gears having more teeth than the other, said drive gear, ring gears and floating gears all having the same normal diametral pitch.

2. The combination with a power shaft having a helical drive gear secured thereto, and a helical idler gear journaled on the shaft adjacent to the drive gear, of helical internal ring gears in the same planes as the drive gear and idler gear respectively and surrounding the same, a series of floating gear units, each comprising two gears, one meshing with the drive gear and the corresponding ring gear, and the other meshing with the idler gear and the other ring gear, the floating gear which meshes with the idler gear being of greater diameter but having the same normal diametral pitch as the other floating gear in the same unit, the idler gear being smaller in diameter than the drive gear, and the ring gear which is in the same plane with the idler gear being correspondingly greater in diameter than the other ring gear.

3. The combination with a power shaft having a helical drive gear secured thereto, and a helical idler gear journaled on the shaft adjacent the drive gear, a helical internal ring gear surrounding the drive gear and idler respectively, one of said ring gears having more teeth than the other, and a series of floating gear units, each comprising one gear meshing with the drive gear and corresponding ring gear and another gear meshing with the idler and the other ring gear, all of said gears having the same normal diametral pitch, the ring gear having the greater number of teeth being of smaller diameter than the other ring gear.

4. The combination with a power shaft having a helical drive gear secured thereto, and a helical idler gear journaled on the shaft adjacent the drive gear, of helical internal ring gears surrounding the drive gear and idler respectively, one of said ring gears having more teeth than the other, a series of floating gear units, each consisting of one gear meshing with the drive gear and the corresponding ring gear and another gear meshing with the idler and the other ring gear, the teeth on the two gears constituting one unit being opposite each other, and the teeth on the gears of each of the other floating gear units being circumferentially offset to correspond to the relative positions of the teeth in the ring gears where the floating gears are to be inserted, the teeth of all of said gears having the same normal diametral pitch.

5. The combination with a power shaft, of two housing members journaled thereon and each rotatable relatively to the other, said members having opposed peripheral rims fitting one within the other to enclose a cylindrical space, two ring gears secured to the inner sides of the respective rims and having internal teeth, one having more teeth than the other, a central idler gear journaled on said shaft in the plane of one ring gear, a central drive gear secured to the shaft in the plane of the other ring gear, a series of floating gear units within the housing and each comprising two gears rigidly connected together, one meshing with the idler gear and the corresponding ring gear, and the other meshing with the drive gear and the other ring gear, means for holding one of the housing members against rotation, and means for securing the other housing member to a shaft to be driven.

6. The combination with a power shaft, of two housing members journaled thereon and each rotatable relatively to the other, said members having opposed peripheral rims fitting one within the other to enclose a cylindrical space, two ring gears secured to the inner sides of the respective rims in parallel planes and having internal helical teeth, one having more teeth than the other, a central helical idler gear journaled on said shaft in the plane of one ring gear, a central helical drive gear secured to the shaft in the plane of the other ring gear, a series of floating gear units within the housing and each comprising two gears rigidly secured to each other, one meshing with the idler gear and the corresponding ring gear, and the other meshing with the central drive gear and the other ring gear, all of said gears having the same normal diametral pitch, means for holding one of the housing members against rotation, and means for securing the other housing member to the shaft to be driven.

7. The combination with a power shaft having a helical drive gear secured thereto, and an idler gear journaled on the shaft adjacent the drive gear and having a different number of teeth than the drive gear, of helical internal ring gears surrounding the drive gear and idler gear respectively, a series of floating gear units, each comprising two gears rigidly secured together, one meshing with the drive gear and the corresponding ring gear, and the other meshing with the idler gear and the other ring gear, the teeth of all intermeshing gears having the same normal diametral pitch, the number of teeth in each ring gear being equal to the number of teeth in the corresponding central gear plus twice the number of teeth in one of the floating gears.

8. The combination with a power shaft having a helical drive gear secured thereto, and a helical idler gear journaled on the shaft adjacent the drive gear, of helical internal ring gears surrounding the drive gear and idler gear respectively, and a series of floating gear units, each comprising two helical gears, one meshing with the drive gear and the ring gear surrounding the same, and the other meshing with the idler gear and the other ring gear, one of said ring gears having more teeth than the other, said drive gear, ring gears and floating gears all having the same normal diametral pitch, the number of teeth in each ring gear being equal to the number of teeth in the corresponding central gear, plus twice the number of teeth in one of the floating gears.

9. The combination with a power shaft having a helical drive gear secured thereto, and a helical idler gear journaled on the shaft adjacent to the drive gear, of helical internal ring gears in the same planes as the drive gear and idler gear respectively and surrounding the same, a series of floating gear units, each comprising two gears, one meshing with the drive gear and the corresponding ring gear, and the other meshing with the idler gear and the other ring gear, the floating gear which meshes with the idler gear being of greater diameter but having the same normal diametral pitch as the other floating gear in the same unit, the idler gear being smaller in diameter than the drive gear, and the ring gear which is in the same plane with the idler gear being correspondingly greater in diameter than the other ring gear, the number of teeth in each ring gear being equal to the number of teeth in the corresponding central gear plus twice the number of teeth in one of the floating gears.

10. The combination with a power shaft having a helical drive gear secured thereto, and a helical idler gear journaled on the shaft adjacent the drive gear, of helical internal ring gears surrounding the respective central gears, and a series of floating gear units interposed between the ring gears and the central gears, each floating gear unit comprising two gears rigidly connected together, one meshing with the idler gear and the corresponding ring gear, and the other meshing with the drive gear and the other ring gear, all of said gears having the same normal diametral pitch, one of the central gears having a greater number of teeth than the other central gear, the number of teeth in each ring gear being equal to the number of teeth in the corresponding central gear plus twice the number of teeth in one of the floating gears, the ring gear having the greater number of teeth being of smaller diameter than the other ring gear.

In testimony, that I claim the foregoing as my own, I have hereto affixed my signature.

WILLIAM LEWIS EVANS.